United States Patent [19]
Wolverton et al.

[11] Patent Number: 6,148,113
[45] Date of Patent: Nov. 14, 2000

[54] SYSTEM FOR STIMULATING THE DEPTH OF FIELD OF AN IMAGE IN TWO DIMENSIONAL SPACE AND METHOD OF OPERATION

[75] Inventors: Michael A. Wolverton, Arlington; Deepaka N. Abeysinghe, Plano, both of Tex.

[73] Assignee: Micrografx, Inc., Richardson, Tex.

[21] Appl. No.: 09/018,115

[22] Filed: Feb. 3, 1998

[51] Int. Cl.[7] .................................................. G06K 9/40
[52] U.S. Cl. ........................................ 382/255; 382/254
[58] Field of Search ................................... 382/254–255, 382/260, 264

[56] References Cited

U.S. PATENT DOCUMENTS

| | | | |
|---|---|---|---|
| 5,003,618 | 3/1991 | Meno | 382/54 |
| 5,055,918 | 10/1991 | Berman | 358/22 |
| 5,097,516 | 3/1992 | Amir | 382/1 |

FOREIGN PATENT DOCUMENTS

| | | | |
|---|---|---|---|
| 0 610 080 | 8/1994 | European Pat. Off. . | |
| 0 610 080 A1 | 8/1994 | European Pat. Off. | G06F 15/68 |
| 2 325 131 | 11/1998 | United Kingdom | G06T 15/10 |
| WO 96/14621 | 5/1996 | WIPO | G06T 15/00 |

OTHER PUBLICATIONS

Attachment #2, Fractal Design Painter 5.0 Help Documentation, Creating Depth of Field.
Attachment #3, Painter 5—Interface, Depth of Field.
Cool Special Effects for Designers Auto/Effect Modules Power/Pac.
Fractal Design Painter 5, User Guide for Macintosh®& Windows®.
PCT International Search Report for PCT/US99/02245.

*Primary Examiner*—Thomas D. Lee
*Assistant Examiner*—Stephen Brinich
*Attorney, Agent, or Firm*—Baker Botts, L.L.P.

[57] ABSTRACT

A system for simulating a depth of field of an image includes a microprocessor coupled to a graphics input device, an input device, an output device, and a memory. The microprocessor executes a camera simulation application to accomplish depth of field "focusing" of the image in a two dimensional space by simulating defocusing and light fall-off effects similar to those generated by a camera lens. The input device specifies a variety of camera-like controls and parameters in response to user instruction.

33 Claims, 8 Drawing Sheets

| 132 | 116 | 118 | 120 | 122 |
|---|---|---|---|---|
| CIRCLE COUNT | RADIUS R (PIXELS) | BRIGHTNESS B | DEFOCUS WEIGHT f | DEGREE OF DEFOCUS C |
| 0 | 10 | 1.0 | – | 0 |
| 1 | 20 | 1.0 | .035 | 1 |
| 2 | 30 | .990 | .101 | 7 |
| 3 | 40 | .984 | .185 | 17 |
| ○○ | ○○ | ○ | ○ | ○ |
| n | (n+1)10 | ○ | ○ | ○ |

6,148,113

SYSTEM FOR STIMULATING THE DEPTH OF FIELD OF AN IMAGE IN TWO DIMENSIONAL SPACE AND METHOD OF OPERATION

TECHNICAL FIELD OF THE INVENTION

This invention relates in general to computer graphics systems, and more particularly to a system for simulating the depth of field of an image in two dimensional space and method of operation.

BACKGROUND OF THE INVENTION

A traditional camera lens generates images with varying degrees of defocusing and light fall-off to create a depth of field in an image. A depth of field is the area of sharpness from near to far within a given scene in a photograph. The depth of field of an image is controlled by adjusting the focal length of the camera lens, or zoom factor, and the size of the aperture opening, or f-stop setting, of the camera lens. The size of the aperture opening determines the amount of light allowed into a camera lens to expose the film. For example, as the f-stop increases and the aperture hole becomes smaller, objects in the scene that are farther away from the camera become focused. Likewise, as the f-stop decreases and the aperture hole becomes larger, these same objects become defocused. As the aperture hole gets smaller, less light enters the camera, thus darkening the image. This is referred to as light fall-off.

Traditional computer graphics systems cannot simulate defocusing and light fall-off effects similar to those generated by a camera lens for an image in two dimensional space. One approach attempts to apply a shading effect to two dimensional images to simulate depth of field. This approach employs hardware to alter the lighting applied to an image and does not model a camera depth of field effect. Other approaches apply a crude blurring effect to the image without reference to traditional camera operation

SUMMARY OF THE INVENTION

In accordance with the present invention, a system for simulating the depth of field of an image in two dimensional space is provided which substantially eliminates or reduces disadvantages and problems associated with previous computer graphics systems.

In accordance with one embodiment of the present invention, a system for simulating a depth of field of an image in a two dimensional space includes a memory that stores the image and an input device that specifies input parameters for adjusting the image about a selected point of focus. A processor coupled to the memory and the input device divides the image into a plurality of figures about the point of focus. The processor adjusts the image progressively outward from the point of focus according to each figure, and in response to the input parameters.

Another embodiment of the present invention is a method for simulating the depth of field of an image in a two dimensional space, wherein the method includes receiving the image and specifying a point of focus on the image. The method further includes receiving input parameters for adjusting the image about the point of focus. The method concludes by adjusting the image progressively outward from the point of focus in response to the input parameters.

Technical advantages of the present invention include a system that accomplishes depth of field focusing of an image in a two dimensional space by simulating defocusing and light fall-off effects similar to those generated by a camera lens. In addition, the system performs the depth of field simulation with respect to user-defined camera-like controls and parameters to establish a meaningful photographic environment within which the user may view the adjusted image.

BRIEF DESCRIPTION OF THE DRAWINGS

For a more complete understanding of the present invention and its advantages, reference is now made to the following description taken in conjunction with the accompanying drawings, in which like reference numbers indicate like features and wherein.

DETAILED DESCRIPTION OF THE INVENTION

Figure 1:
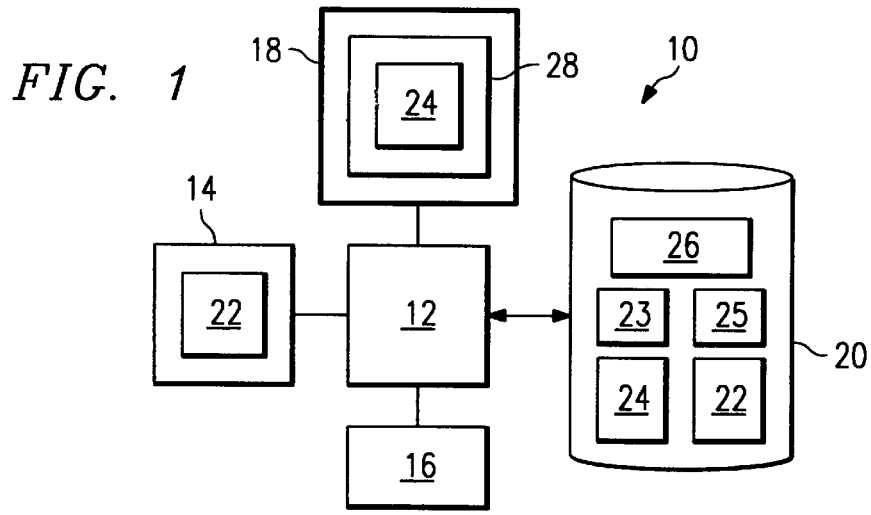
FIG. 1 illustrates a block diagram of a system for simulating a depth of field of an image in accordance with the present invention.

FIG. 1 illustrates a block diagram of a system 10 for simulating a depth of field of an image 22. System 10 includes a microprocessor 12 coupled to a graphics input device 14, an input device 16, an output device 18, and a memory 20. In general, microprocessor 12 executes a camera simulation application 26 to accomplish depth of field "focusing" of image 22 in a two dimensional space by simulating defocus and light fall-off effects similar to those generated by a camera lens.

Microprocessor 12 may comprise a central processing unit associated with a computer system, such as a mainframe, a workstation, or any other suitable general purpose data processing facility. In general, microprocessor 12 executes camera simulation application 26 on any suitable operating system environment, such as, for example, MS-DOS, PC-DOS, OS2, MAC-OS™, or Windows™.

Graphics input device 14 may comprise a scanning device, a digital camera, a disk drive, a CD-ROM drive, or any other suitable device that produces a digitized version of image 22 to store in any appropriate format, such as, for example, in a BMP file, a JPEG file, a GIF file, a TIFF file, or any other file suitable for storing video data. Graphics input device 14 may receive image 22 via a network, the Internet, a CD-ROM, or any other source of image 22. In general, graphics input device 14 allows microprocessor 12 to convert image 22 into code that camera simulation application 26 can use to execute the depth of field simulation and to produce an adjusted image 24 for display on output device 18.

Input device 16 may comprise a keyboard and mouse, track-ball or other suitable input device. Input device 16 specifies a variety of input parameters, such as a lens length, a zoom factor, an f-stop setting, a light fall-off parameter, and a point of focus (x, y), in response to user instruction. Collectively, these inputs are referred to as camera parameters because they model the controls of an actual camera and provide contextual meaning to the depth of field simulation of image 22.

The lens length parameter indicates the size of a camera lens through which the depth of field of image 22 is simulated. For example, a user may desire to view image 22 as though it were photographed with a 35 mm lens. In this case, the user specifies a lens length of 35 mm and system 10 processes image 22 accordingly. Each lens type has a default zoom factor and aperture opening size or f-stop setting. The zoom factor indicates the focal length of the camera lens selected by the user and models a change in the size of image 22 or the illusion of camera movement. For example, the user may desire to view image 22 as though the camera used to photograph image 22 was in near proximity to the object in image 22. In this case, the user specifies a zoom factor greater than the default value and system 10 defocuses image 22 accordingly.

The f-stop setting controls the size of the aperture opening of the camera lens. As the f-stop setting increases, the range of objects in focus increases creating a sharper image, while the size of the aperture opening decreases creating a darker image. As the f-stop setting decreases, the range of objects in focus decreases creating a defocused image, while the size of the aperture opening increases creating a brighter image. The light fall-off parameter controls the amount of light entering the aperture opening and simulates a level of underexposure or overexposure of film to generate a lighter or darker image 24.

The point of focus (x,y) defines that point on image 22 from which the defocusing and light fall-off effects emanate. In one embodiment, a user may select multiple points of focus to defocus and generate light fall-off at different levels of depth to simulate enhanced camera-like effects. Surrounding the point of focus is an area of focus whose size is determined by the camera parameters and which remains focused throughout the camera simulation. It should be understood that although the camera-like effects generated by the lens length parameter, zoom factor, f-stop setting, and light fall-off parameter are described separately above, system 10 combines one or more of these camera parameters to generate the appropriate camera simulation.

Output device 18 may comprise a cathode ray tube display, a liquid crystal display, a flat panel display, a printer, a file, or any other suitable output device. Output device 18 displays image 24 and the camera parameters on a graphical user interface 28 ("GUI") associated with camera simulation application 26. GUI 28 serves as an easy-to-use and interactive interface between a user and application 26.

Memory 20 may comprise a file, a stack, or any other suitable organization of volatile or non-volatile memory that stores the digital values associated with images 22 and 24, camera simulation application 26, and any associated files, tables, or buffers in RAM, ROM, a CD-ROM, or any other form of magnetic or optical storage. For example, memory 20 stores a table 23 of acceptable values for the camera parameters and a series of image buffers 25 which store digital values associated with image 22 during the camera simulation.

Camera simulation application 26 may comprise a software computer application written in a computer language such as, for example, C or C++, that may be compiled based on the instructions of the selected computer operating system. Application 26 presents the user with GUI 28 that provides camera-like controls and parameters in a photographic environment. Application 26 processes these camera parameters and applies them to a selected image 22 to simulate a depth of field effect similar to that generated by a camera lens. GUI 28, associated with application 26, displays adjusted image 24 in conjunction with the selected camera parameters to provide a meaningful photographic environment within which to view the image.

In operation, graphics input device 14 translates a range of analog voltage levels associated with image 22 into a corresponding range of digital values. Memory 20 stores these digital values in a file, such as a BMP file, a TIFF file, a GIF file, a JPEG file, or any other file suitable for storing video data. In some cases, these digital values may already be stored in such a file. Microprocessor 12 launches camera simulation application 26 in response to user instruction. Application 26 receives the digital values associated with image 22 from graphics input device 14 or memory 20, and presents to the user image 22 and several entry fields associated with the camera parameters via GUI 28. Input device 16 specifies to application 26 the camera parameters selected by the user. Application 26 processes the camera parameters to simulate defocusing and light fall-off effects in two dimensional space for image 22 similar to those of a camera lens.

In a particular embodiment, application 26 divides image 22 into concentric figures, such as, for example, circles, pear shapes, ovals, squares, or triangles, having progressively larger sizes and centers at the point of focus selected by the user. Each successive figure defines a particular degree of defocusing and light fall-off for each pixel of image 22 residing in that particular figure, in response to the camera parameters selected by the user Application 26 successively processes each pixel of image 22 according to the defocusing and light fall-off values associated with the pixel. The resulting image 24 simulates the camera-like effects specified by the user in the camera parameters. Output device 18 displays adjusted image 24 in a preview window of GUI 28 to preview the changes to image 22, or in an enlarged format to apply the changes and provide more detail and resolution.

In another embodiment, the user may select one or more regions of focus in addition to one or more points of focus to defocus and generate light fall-off at different levels of depth to simulate enhanced camera-like effects. For example, the user may specify the center of image 22 as a point of focus but may also select a region of focus towards the edge of image 22 by manipulating input device 16 to highlight, outline, or in some other way select a region of focus. The pixels associated with the region of focus are stored in a table that is referred to by application 26 during processing. When application 26 reaches a pixel that is protected by the selected region of focus, application 26 does not process that pixel. Rather, application 26 proceeds to the next pixel for processing Therefore, both the area of focus surrounding a point of focus and a selected region of focus remain focused throughout the camera simulation so that, for example, they appear to be at the same level of depth in a given scene.

The depth of field simulation may be accomplished in a color environment by splitting each pixel of image 22 into color channels, such as, for example, red, green, and blue color channels. In this case, application 26 applies the appropriate defocusing and light fall-off effects to each color channel of a pixel separately, and recombines the color channels after processing each pixel to recover the final adjusted image 24. Similarly, application 26 may simulate camera-like effects in a gray scale or CMYK environment where the gray scale generates images in black and white and the CMYK environment has a color channel for cyan, magenta, yellow, and black.

Figure 2A:
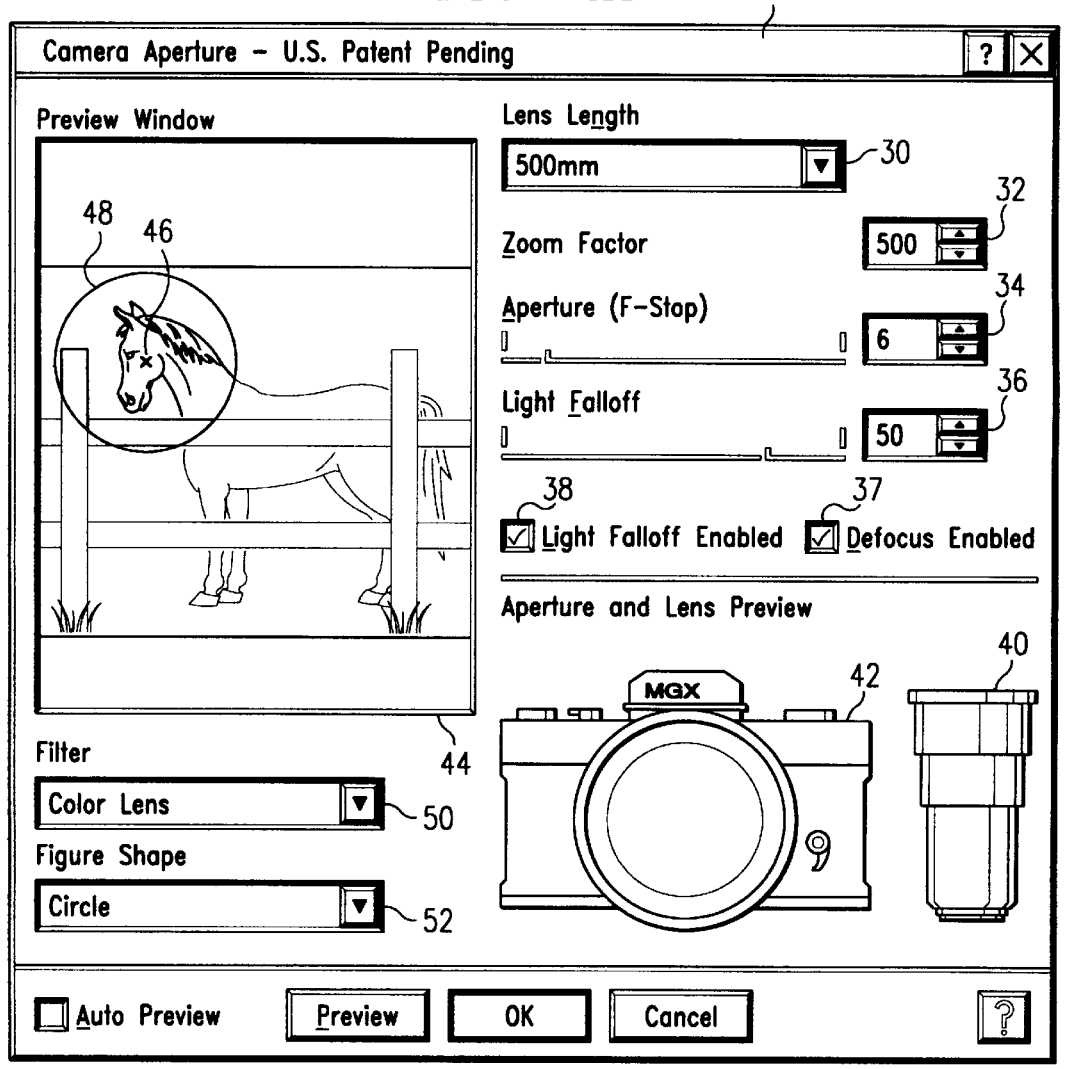
FIGS. 2A and 2B illustrate one embodiment of a graphical user interface that may be used in the system.

FIG. 2A illustrates one embodiment of GUI 28 that provides an easy-to-use interactive interface for the user to implement camera simulation application 26. GUI 28 includes camera-like controls and parameter fields for receiving camera parameters such as lens length parameter 30, zoom factor 32, f-stop setting 34, light fall-off parameter 36, defocus enable button 37, and light fall-off enable button 38. GUI 28 displays a lens length illustration 40 and a camera illustration 42 in response to selections made for the camera parameters, to show the user the photographic equipment with which image 22 is simulated. Providing the user with meaningful camera-like controls and illustrations establishes a photographic environment within which the user may view the depth of field simulation for image 22.

GUI 28 includes a preview window 44 that displays image 22 prior to processing and a preview of image 24 after processing image 22 using the camera parameters. This provides visual feedback to a user as to the progress of the camera-like effects. GUI 28 includes a viewfinder similar to one found in a camera lens so that the user may select a point of focus 46. Surrounding point of focus 46 is area of focus 48. The user may also view image 24 in an enlarged format to reveal greater detail and resolution. GUI 28 also includes a filter parameter 50 to specify pre-processing or post-processing of image 22, and a figure shape parameter 52 to specify the shape of the concentric figures used to process image 22.

Figure 2B:
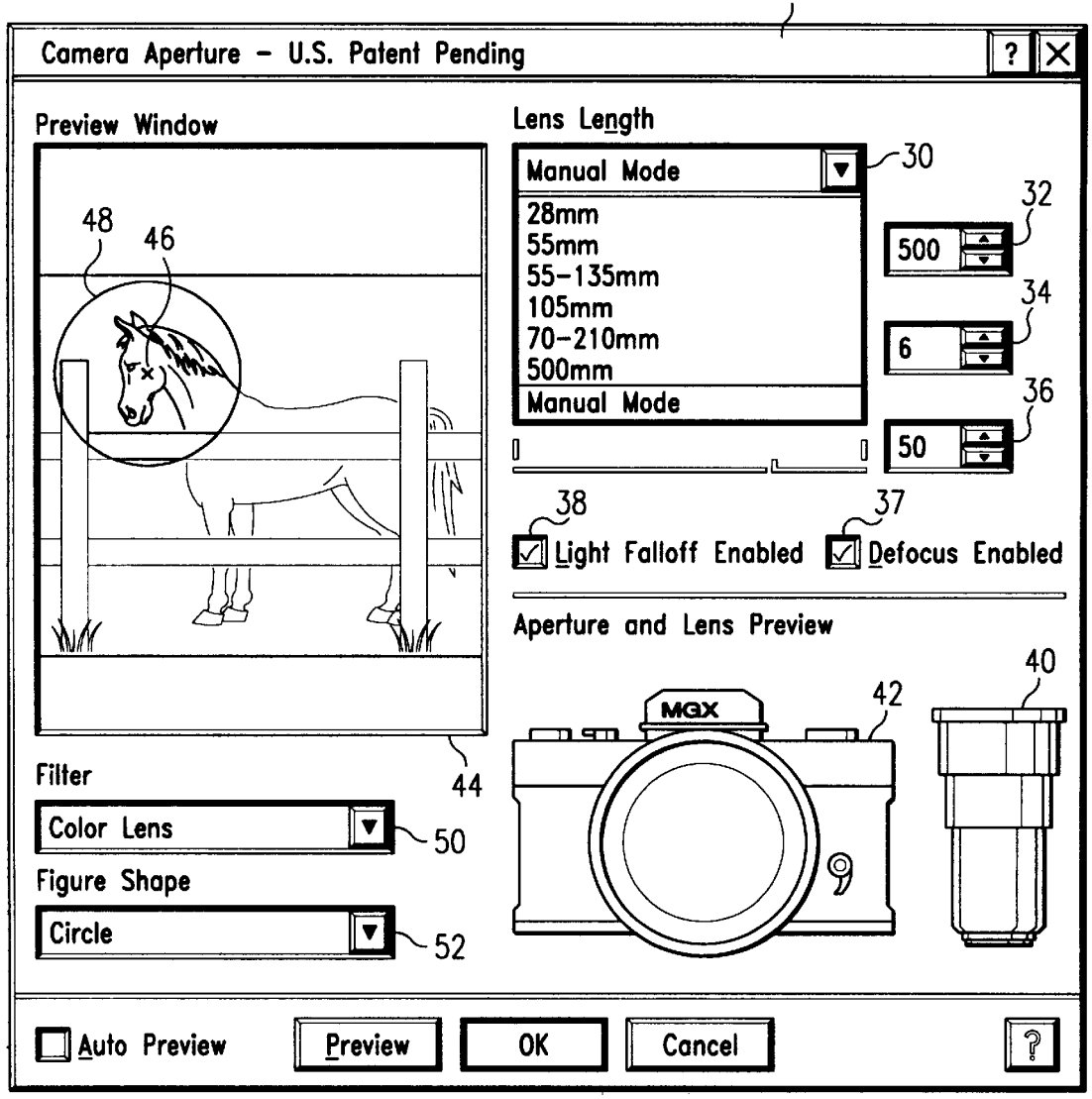

Referring to FIG. 2B, one embodiment of the present invention limits the values accepted from a user for zoom factor 32 to a subset of all possible values based upon the selection made for lens length parameter 30. For example, a 500 mm lens length selected in field 30 limits the acceptable zoom factor to 500. This provides accurate camera-like controls to provide a realistic and genuine camera simulation. In another embodiment, system 10 allows the user to select "manual mode" in lieu of a specific lens length. This allows the user to choose any values for zoom factor 32 and to experiment with the camera-like effects to generate more enhanced images 24 not attainable by an actual camera lens. In either manual mode or for a specific lens length, the user may specify any value for f-stop from 1–64 and any value for light fall-off from –100 to 100. A light fall-off from 0–100 means image 22 is darkened; a light fall-off from –100 to 0 means image 22 is lightened; and a light fall-off of 0 means the image is neither darkened nor lightened.

Figure 3A:
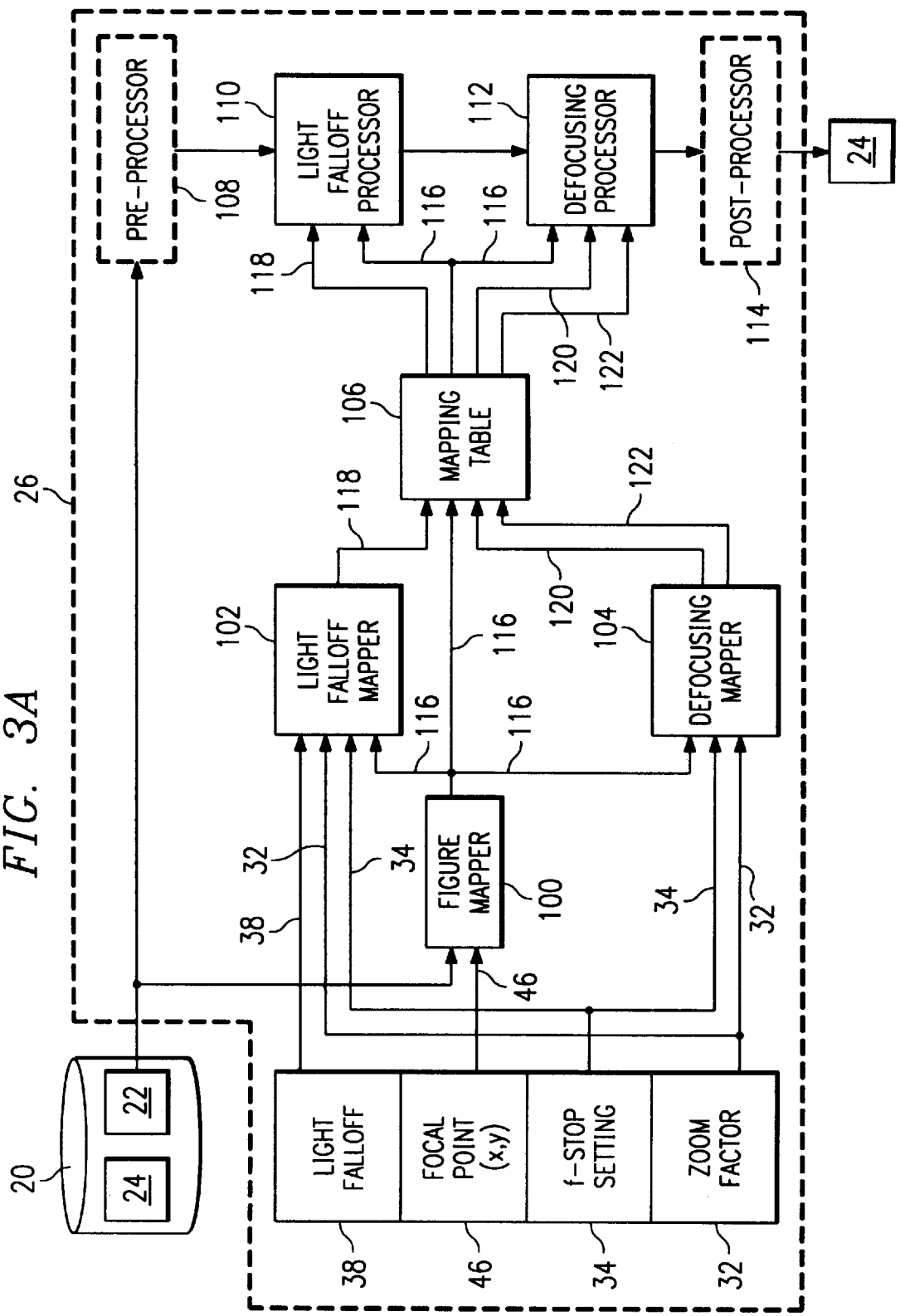
FIG. 3A illustrates a block diagram of the camera simulation application running on the system.

FIG. 3A illustrates one embodiment of camera simulation application 26 running on system 10. In general, figure mapper 100, light fall-off mapper 102, and defocusing mapper 104, each receive one or more of the camera parameters entered by the user and, in response, generate a mapping table 106 that defines the defocusing and light fall-off factors associated with each pixel of image 22. A light fall-off processor 110 and a defocusing processor 112 serially process image 22 by applying each processor's associated camera-like effect. Application 26 may also use similar processors to provide other camera-like effects. It should be understood that processors 110 and 112, or any other processor used to implement camera-like effects, may comprise one or more physical microprocessors.

Light fall-off processor 110 coupled to mapping table 106 receives image 22 from device 14 or memory 20. Light fall-off processor 110 successively processes each pixel of image 22 by retrieving that pixel's associated light fall-off factor from mapping table 106 and applying it to the digital value of that pixel. After processor 110 applies the light fall-off effect to each pixel of image 22, defocusing processor 112, coupled to mapping table 106 and light fall-off processor 110, receives the partially processed image 22 from processor 110 for further processing. Defocusing processor 112 successively processes each pixel of image 22 by retrieving that pixel's associated defocusing factors from mapping table 106 and applying them to the digital value of that pixel, resulting in image 24. A user may disable one or both of light fall-off processor 110 and defocusing processor 112 by toggling defocus enable button 37 or light fall-off enable button 38. This provides the user with more control over the camera-like effects of application 26.

In one embodiment, application 26 includes a pre-processor 108 coupled to light fall-off processor 110, or a post-processor 114 coupled to defocusing processor 112, or both. Processors 108 and 114 process image 22 to simulate a lens filter, or any other type of filtering. For example, application 26 simulates a color filter when a user chooses a color filter subsystem from either processor 108 or 114. In this case, each pixel of image 22 is processed so that a color, or a combination of colors, are added to the existing colors of image 22. Other filter subsystems that may be selected include, for example, a flare filter subsystem which adds stars or hot points to image 22, a soft focus filter subsystem that softens any bright lights in image 22, or any other suitable filter subsystem that simulates a camera lens filter or that models a particular type of film processing. In one embodiment, processors 108 and 114 separate each pixel of image 22 into separate color channels, apply the appropriate filter to each pixel for each color channel, and recombine each color channel to form image 24. A filter subsystem chosen from pre-processor 108 processes image 22 prior to applying the camera-like effects. A filter subsystem chosen from post-processor 114 processes image 22 after applying the camera-like effects.

Figure mapper 100 receives the x,y coordinates associated with point of focus 46 and the width and height dimensions of image 22 measured in pixels. Figure mapper 100 then divides image 22 into concentric figures having progressively larger sizes, each figure having point of focus 46 at its center. Although figure mapper 100 is hereinafter described with reference to concentric circles, it should be understood that figure mapper 100 may divide image 22 into many different concentric figures, such as, for example, circles, pear shapes, ovals, squares, triangles, or any other suitable figure that simulates the way a human eye perceives depth of field. Furthermore, the figure may be shaped like the region of focus selected by the user. Figure mapper 100 determines a radius 116 for each concentric circle of image 22 so that the appropriate defocusing and light fall-off effects may be applied gradually from point of focus 46 toward the edges of image 22. The radius of the innermost circle, which defines a part of focal area 48, is based upon the width and height of image 22 and the x,y coordinate of point of focus 46.

Figures 3B, 4:
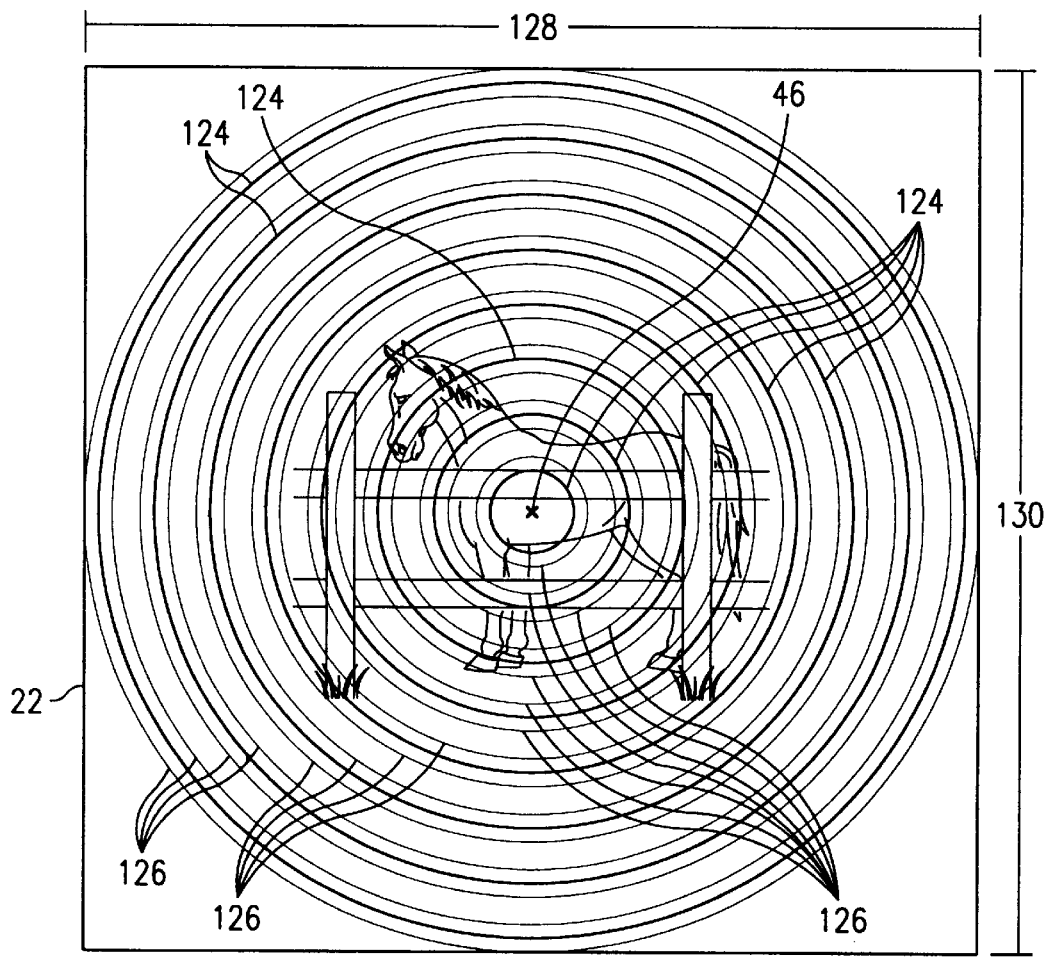
FIG. 3B illustrates the image divided into concentric figures by the camera simulation application running on the system.
FIG. 4 illustrates a mapping table generated by the camera simulation application running on the system.

FIG. 3B illustrates one embodiment of image 22 divided into concentric figures. In this embodiment, figure mapper 100 divides image 22 into a constant number of major and minor concentric circles, such as, for example, twenty-three concentric circles including eight major circles 124 and fifteen minor circles 126. Each minor circle 126 is associated with a major circle 124 to provide a smooth transition for the camera-like effects between concentric circles as they emanate from point of focus 46. The number of concentric circles and radius 116 of each may be selected to provide a particular level of detail and resolution. For example, including a greater number of concentric circles provides greater detail and resolution, while including a lesser amount of concentric circles provides lesser detail and resolution. The number of concentric circles may be predetermined or determined by the user. For example, a user selects a particular level of resolution desired for image 22 and figure mapper 100 determines the number of concentric circles required to achieve that level of resolution.

Figure mapper 100 positions the eight major circles 124 within image 22 such that each successive major circle 124 is a factor of focal radius larger than the last. For example, figure mapper 100 selects one-half of either the width 128 or the height 130 of image 22 and divides this number of pixels by the number of major circles 124 to determine the radius, R, of the innermost circle 124. Each successive major circle 124 has a radius 116 based upon the radius of the innermost major circle 124. Therefore, the second major circle 124 has radius 116 of 2R, the third major circle 124 has radius 116 of 3R, and so on until each successive major circle 124 is assigned an appropriate radius 116.

Each minor circle 126 is assigned a radius 116 that is offset from the radius 116 of an associated major circle 124 by a constant value of pixels. Each major circle 124 has one or more associated minor circles 126 that border the major circle 124 on either side such that the minor circles 126 are concentric with the major circles 124. For example, if the second major circle 124 has radius 116 of twelve pixels from point of focus 46, then its associated inner and outer minor circles 126 may have radius 116 of eleven pixels and thirteen pixels, respectively. The number of minor circles 126 and radius 116 of each minor circle 126 as an offset of its associated major circle 124 is selected with respect to the desired level of resolution for image 24. Adding several minor circles 126 around each associated major circle 124 generates smaller regions of defocusing and light fall-off resulting in a greater resolution of image 24. This technique provides a smooth transition for the camera-like effects between concentric figures to generate a more realistic image 24.

In another embodiment, each successive concentric circle has radius 116 that models an energy curve. For example, rather than assigning radius 116 for each concentric circle equidistant from each other, figure mapper 100 assigns to each successive circle a radius 116 that is a factor of energy smaller than the previous major circle 124. In this embodiment, radius 116 of each circle is also based upon f-stop settings 34. After determining radius 116 of each concentric circle, figure mapper 100 populates the radius column of mapping table 106 accordingly. This column stores radius 116 of each concentric circle from the innermost circle to the outermost circle.

Referring back to FIG. 3A, light fall-off mapper 102 receives radius 116 of each concentric circle generated by figure mapper 100, zoom factors 32, f-stop settings 34, and light fall-off parameters 38. In response, light fall-off mapper 102 generates and assigns a level of brightness factor 118 to each concentric circle of image 22 so that image 22 progressively darkens or brightens outward from point of focus 46. In general, light fall-off mapper 102 takes into account the light fall-off of a photograph as the aperture opening or f-stop of a camera lens changes. The light fall-off of image 22 dictated by level of brightness factor 118 can be either positive or negative to model the light energy hitting a film for different camera models. In the most extreme cases, light fall-off mapper 102 can model an over-exposed or under-exposed film upon which image 22 is captured. Therefore, light fall-off is inversely proportional to brightness.

Light fall-off mapper 102 determines level of brightness factor 118, "B", for each pixel of a particular concentric circle of image 22 as a function of light fall-off parameter 38, f-stop setting 34, radius 116 of the concentric circle in which the pixel resides, and zoom factor 32 of the camera parameters. In one embodiment, level of brightness factor 118, "B", models the following equation:

$$B_n = \gamma \left( \frac{1}{f - stop^p} \right) \left( \frac{1}{(R_n)^{\beta-k}} \right) \left( \frac{1}{zoom^m} \right)$$

where:

$k \in$   Real numbers associated with light fall-off;

$n \in$   Integer number representing concentric circle count;

$p \in$   Integer number associated with $f$-stop;

$m \in$   Integer number associated with zoom;

$\gamma =$   Proportionality constant;

$\beta =$   Light fall-off parameter supplied by user; and $R =$   Radius of current concentric circle.

where:
  k∈Real numbers associated with light fall-off;
  n∈Integer number representing concentric circle count;
  p∈Integer number associated with f-stop,
  m∈Integer number associated with zoom;
  γ=Proportionality constant;
  β=Light fall-off parameter supplied by user; and
  R=Radius of current concentric circle.

Light fall-off mapper 102 calculates level of brightness factor 118 for radius 116 of each concentric circle of image 22, and populates mapping table 106 accordingly. It should be noted that level of brightness factor 118 compensates for any implicit reduction of brightness that may be caused by the defocusing factors.

Defocusing mapper 104 receives radius 116 of each concentric circle generated by figure mapper 100, zoom factors 32, and f-stop settings 34. In response, defocus mapper 104 generates and assigns defocusing factors 120 and 122 to each concentric circle of image 22 such that image 22 progressively defocuses outward from point of focus 46. In particular, defocus mapper 104 generates a defocus weight factor 120, "f", for each pixel in a particular concentric circle of image 22. Defocus weight factor 120 is applied by defocusing processor 112 in a convolution mask that accounts for the defocusing contribution of neighboring pixels. The level of defocusing applied to a particular pixel is inversely proportional to defocus weight factor 120. In one embodiment, defocus weight factor 120, "f", models the following equation:

$$f_n = \text{func}\{(f\text{-stop})(R_n)/(zoom^k)\}$$

where:
  k∈Real numbers associated with zoom;
  n∈Integer number representing concentric circle count; and
  R=Radius of current concentric circle.

In this case, func{(f-stop) $(R_n)/(zoom^k)$} models a gradient such that as R increases, defocus weight factor 120 increases, simulating a lower degree of defocusing. Defocusing mapper 104 calculates a defocus weight factor 120 for radius 116 of each concentric circle of image 22, and populates mapping table 106 accordingly.

Defocusing mapper 104 also calculates a degree of defocus factor 122, "c", for each pixel in a particular concentric circle of image 22. Degree of defocus factor 122 determines the amount of defocusing to be applied to a given pixel by indicating the number of times defocusing processor 112 applies a convolution mask to that particular pixel to achieve the defocusing effect. In one embodiment, the degree of defocus factor 122, "c", models the following equation:

$$c_n = (R_n)/((f\text{-stop})(\text{func}\{zoom^k\}))$$

where:
 k∈Real numbers associated with zoom;
 n∈Integer number representing concentric circle count; and
 R=Radius of current concentric circle.

In this case, func{$zoom^k$} represents a normalization function. For example, the range of acceptable f-stop values for application 26 ranges from one to sixty-four, while the range of acceptable zoom values for application 26 ranges from twenty to five-hundred. Therefore, func{$zoom^k$} maps the zoom factor to a similar scale as the f-stop parameter so that the contribution from each in determining degree of defocus factor 122 is similar. For example, the normalization function maps the zoom factors from the original range of twenty to five-hundred to a normalized scale of one to seventy-five. Defocus mapper 104 calculates degree of defocus factor 122 for radius 116 of each concentric circle of image 22, and populates mapping table 106 accordingly.

FIG. 4 illustrates mapping table 106 generated by camera simulation application 26. Mapping table 106 stores the defocusing and light fall-off factors associated with radius 116 of each concentric figure of image 22. In particular, mapping table 106 includes a circle count column 132 that stores an integer number representing each concentric circle of image 22. Circle "0" represents the innermost concentric circle, or focal area 48, which is not affected by application 26. Circle "n" represents the outermost concentric circle of image 22. A radius column 116 stores radius 116 measured in pixels for each concentric circle of image 22. A level of brightness column 118 stores level of brightness factor 118 for each concentric circle of image 22. A defocus weight column 120 stores defocus weight factor 120 for each concentric circle of image 22. A degree of defocus column 122 stores degree of defocus factor 122 for each concentric circle of image 22.

Figure 5:
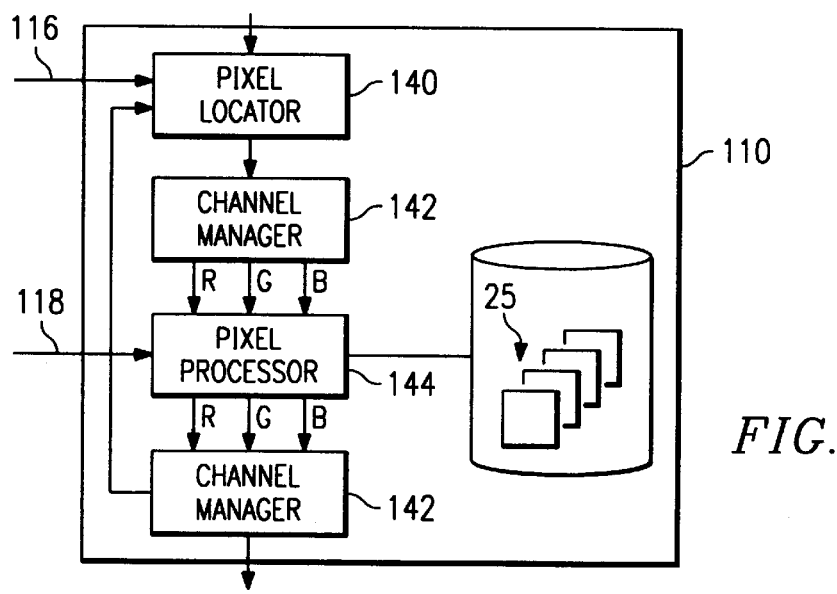
FIG. 5 illustrates a light fall-off processor of the camera simulation application running on the system.

FIG. 5 illustrates light fall-off processor 110 of camera simulation application 26. Light fall-off processor 110 processes each pixel of image 22 in response to its associated level of brightness factor 118 stored in mapping table 106. In one embodiment, processor 110 processes each pixel of image 22 in a raster scan format. For example, processor 110 begins processing on the pixel located in the upper-left corner of image 22 and proceeds to process each successive pixel horizontally. After completing one horizontal sweep across image 22, processor 110 returns back to the left edge of image 22 at a pixel just below the previous scan line. Processor 110 processes each pixel from the upper-left corner of image 22 to the lower-right corner of image 22. A complete sweep of image 22 is called processing a field of image 22. Processor 110 requires processing a single field of image 22 whereas defocusing processor 112 may require processing additional fields of image 22 as dictated by its associated defocusing factors.

Alternatively, processor 110 processes each pixel of image 22 according to concentric figures. For example, processor 110 begins processing each pixel in either the innermost or outermost concentric figure and continues processing through each successive figure until the entire image 22 is processed. This allows processor 110 to generate other enhanced camera-like effects.

Light fall-off processor 110 receives an x,y coordinate and a digital value for each pixel of image 22. Pixel locator 140 maps a particular pixel to an associated concentric circle by comparing the distance between the x,y coordinate of that pixel and point of focus 46 with radius 116 of each concentric circle stored in mapping table 106. Once pixel locator 140 maps the pixel to the appropriate concentric circle, it determines whether the pixel lies within a region of focus selected by the user by comparing the x,y coordinate of the pixel with a table of x,y coordinates protected by the region of focus. If the pixel is protected, then light fall-off processor 110 processes the next pixel in the raster scan format. If the pixel is not protected by the region of focus, a channel manager 142 of light fall-off processor 110 separates that pixel into different color channels, such as, for example, red, green, and blue color channels, for individual processing.

A pixel processor 144 applies the associated level of brightness factor 118 stored in mapping table 106 to the digital value of that particular pixel for each color channel, and stores the result in separate image buffers 25. For example, if a pixel of image 22 has a digital value of one-hundred associated with a red color channel, and a light fall-off factor of 1.5 retrieved from mapping table 106, pixel processor 144 generates for that particular pixel a new digital value of one-hundred-fifty associated with the red color channel. Pixel processor 114 similarly generates a new digital value for the green and blue color channels associated with that particular pixel, and stores these results in separate image buffers 25. Light fall-off processor 110 processes each pixel of image 22 successively in a raster scan format for each color channel to generate a new digital value for each pixel and to store those digital values in image buffers 25. Channel manager 142 recombines the separate color channels to form image 24.

Figure 6:
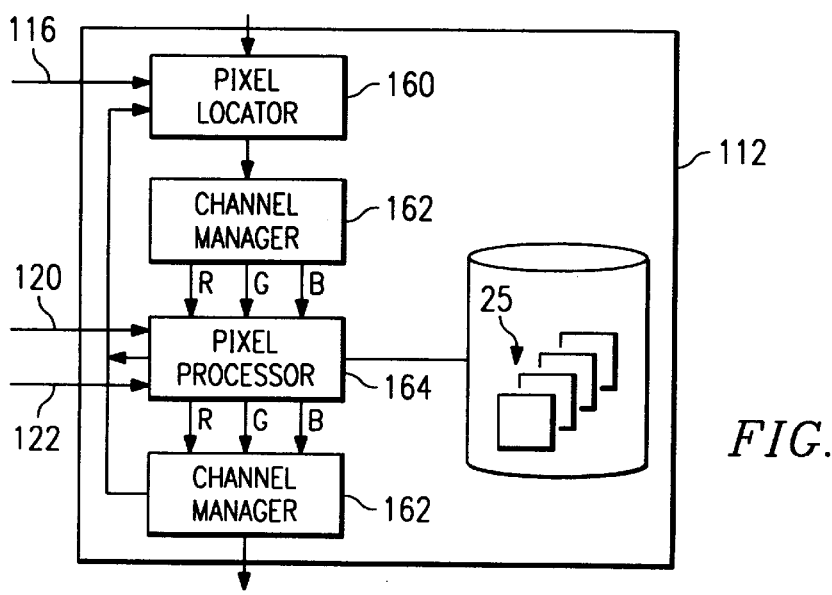
FIG. 6 illustrates a defocusing processor of the camera simulation application running on the system.

FIG. 6 illustrates defocusing processor 112 of camera simulation application 26. Defocusing processor 112 processes each pixel of image 22 in response to its associated defocus weight factor 120 and its associated degree of defocus factor 122 stored in mapping table 106. In particular, defocusing processor 112 receives an x,y coordinate and a digital value for each pixel of image 22. Pixel locator 160 maps a particular pixel to an associated concentric circle by comparing the distance between the x,y coordinate of that pixel and point of focus 46 with radius 116 of each concentric circle stored in mapping table 106.

Once pixel locator 160 maps the pixel to the appropriate concentric circle, it determines whether the pixel lies within the region of focus selected by the user by comparing the x,y coordinate of the pixel with the table of x,y coordinates protected by the region of focus. If the pixel is protected, then defocusing processor 112 processes the next pixel in the selected processing format. If the pixel is not protected by the region of focus, a channel manager 162 separates that pixel into different color channels, such as, for example, red, green, and blue color channels, for individual processing. A pixel processor 164 applies the convolution mask to the digital value of that particular pixel for each color channel of the pixel in response to its associated defocus weight factor 120 and its associated degree of defocus factor 122 to generate the appropriate defocusing effect for image 22.

For example, pixel processor 164 initializes a counter to zero upon beginning the defocusing effect on image 22. Processor 164 determines whether a particular pixel requires defocusing by comparing the associated degree of defocus factor 122 retrieved from mapping table 106 with the current value of the counter. If degree of defocus factor 122 is greater than the value of the counter, then pixel processor 164 applies the convolution mask to the digital values of the pixel's separate color channels.

In one embodiment, defocusing processor 112 applies the following normalized convolution mask to the pixel in interest to account for the defocusing contribution from its neighboring pixels:

$$\begin{matrix} \text{Normalized} \\ \text{Convolution} = \\ \text{Mask} \end{matrix} \begin{bmatrix} 1 & 2 & 1 \\ 2 & f & 2 \\ 1 & 2 & 1 \end{bmatrix} \Big/ (\text{weight})$$

where weight $= (12 + f)$

Pixel processor 164 determines the contribution from the neighboring pixels by centering the convolution mask over the pixel in interest such that the digital value of a particular color channel of the pixel in interest is multiplied by "f". Each of the eight mask values surrounding "f" are multiplied by the digital values of the same color channel of each of the eight neighboring pixels around the pixel in interest. For example:

$$\begin{bmatrix} 1 & 2 & 1 \\ 2 & 1000 & 2 \\ 1 & 2 & 1 \end{bmatrix} \cdot \begin{bmatrix} 100 & 100 & 100 \\ 100 & 200 & 100 \\ 100 & 100 & 100 \end{bmatrix} = [201,200] \Rightarrow [198.81]$$

$$\begin{matrix} & & \text{Summed and} \\ & \text{Digital Values of} & \\ & \text{Processed digital} & \text{normalized} \\ \text{Convolution} & \text{a set of pixels} & \\ & \text{values for the} & \text{digital value} \\ \text{Mask} & \text{for a particular} & \\ & \text{same set of pixels} & \text{for pixel in} \\ & \text{color Channel} & \\ & & \text{interest} \end{matrix}$$

In this example, defocus weight factor 120, "f", in the convolution mask is 1000. The digital value of the pixel in interest is 200, and the digital value of each of the eight neighboring pixels is 100. Pixel processor 164 adds each of the nine processed digital values to generate a new digital value of the pixel in interest. In this case, the new digital value equals 201,200. Pixel processor 164 divides the new digital value by the weight of the convolution mask, (12+f), to generate a normalized digital value for the pixel in interest. In this case, pixel processor 164 divides 201,200 by 1,012 to generate 198.81 for the value of the pixel in interest. The digital value of the pixel in interest is normalized to ensure that it lies within a range suitable for display on output device 18.

The convolution mask affects only the value of the pixel in interest by accounting for the defocusing contribution of neighboring pixels. The digital values for the neighboring pixels remain unchanged until they too are processed as the pixel in interest. For the case where the pixel in interest has fewer than eight neighboring pixels, only that portion of the convolution mask is applied that corresponds to the existing neighboring pixels.

Pixel processor 164 applies this convolution mask separately to the digital values of each color channel of a pixel and stores each normalized digital value in separate image buffers 25 associated with each color channel of the pixel. After processing one field of image 22, pixel processor 164 increments the counter by one and then determines whether any pixels of image 22 require further defocusing by comparing each degree of defocus factor 122 stored in mapping table 106 with the current value of the counter. If any degree of defocus factor 122 is greater than the value of the counter, then pixel processor 164 returns to the upper-left corner of image 22 to begin processing a new field of image 22. This defocusing process continues until no pixels require any further defocusing. In particular, the defocusing continues until no pixel has a degree of defocus factor 122 greater than the counter maintained by pixel processor 164. At this point, channel manager 160 recombines the separate color channels stored in image buffers 25 to form image 24.

Figure 7A:
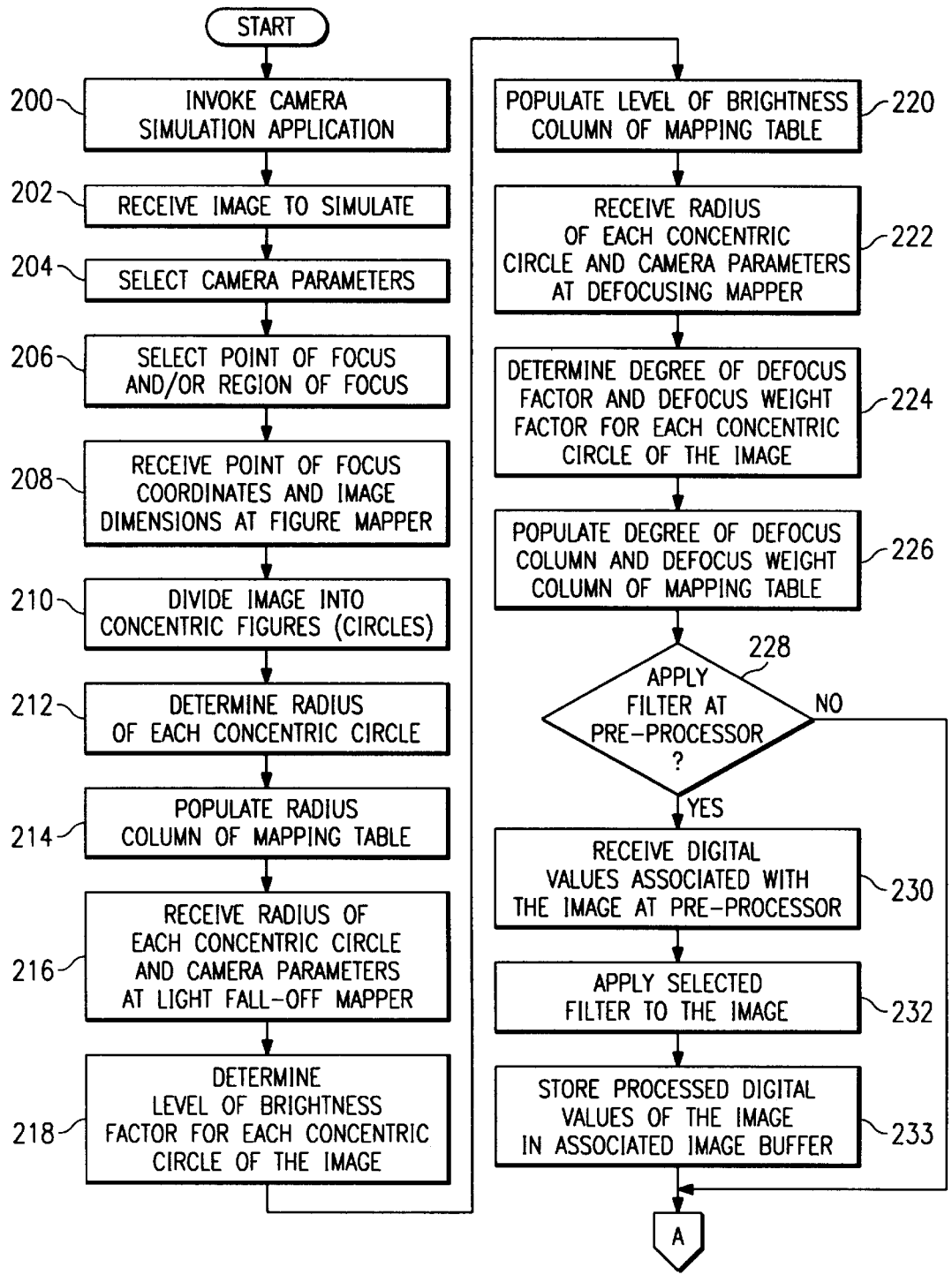
FIGS. 7A–7C illustrate a flowchart of a method for simulating a depth of field of an image.
Figure 7B:
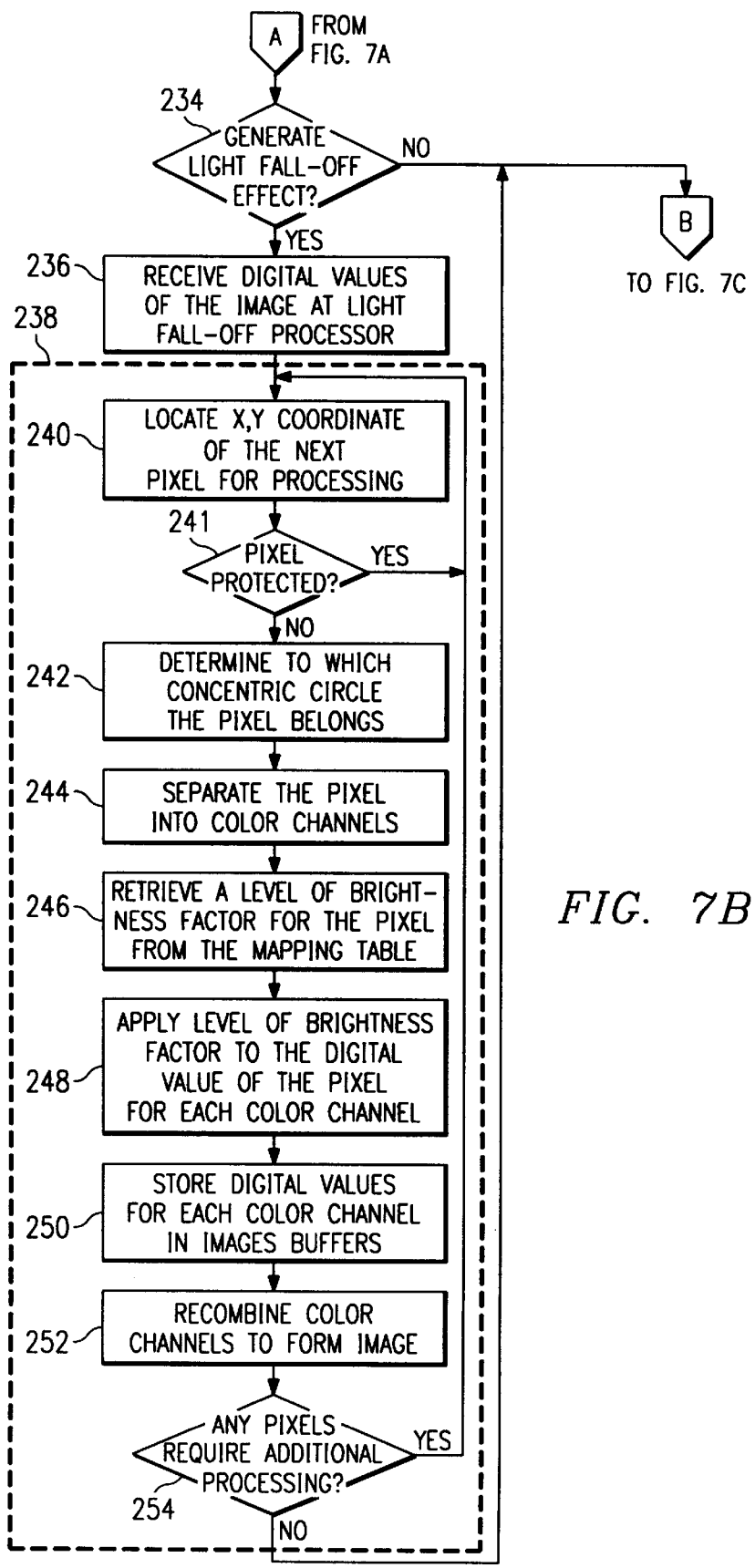
Figure 7C:
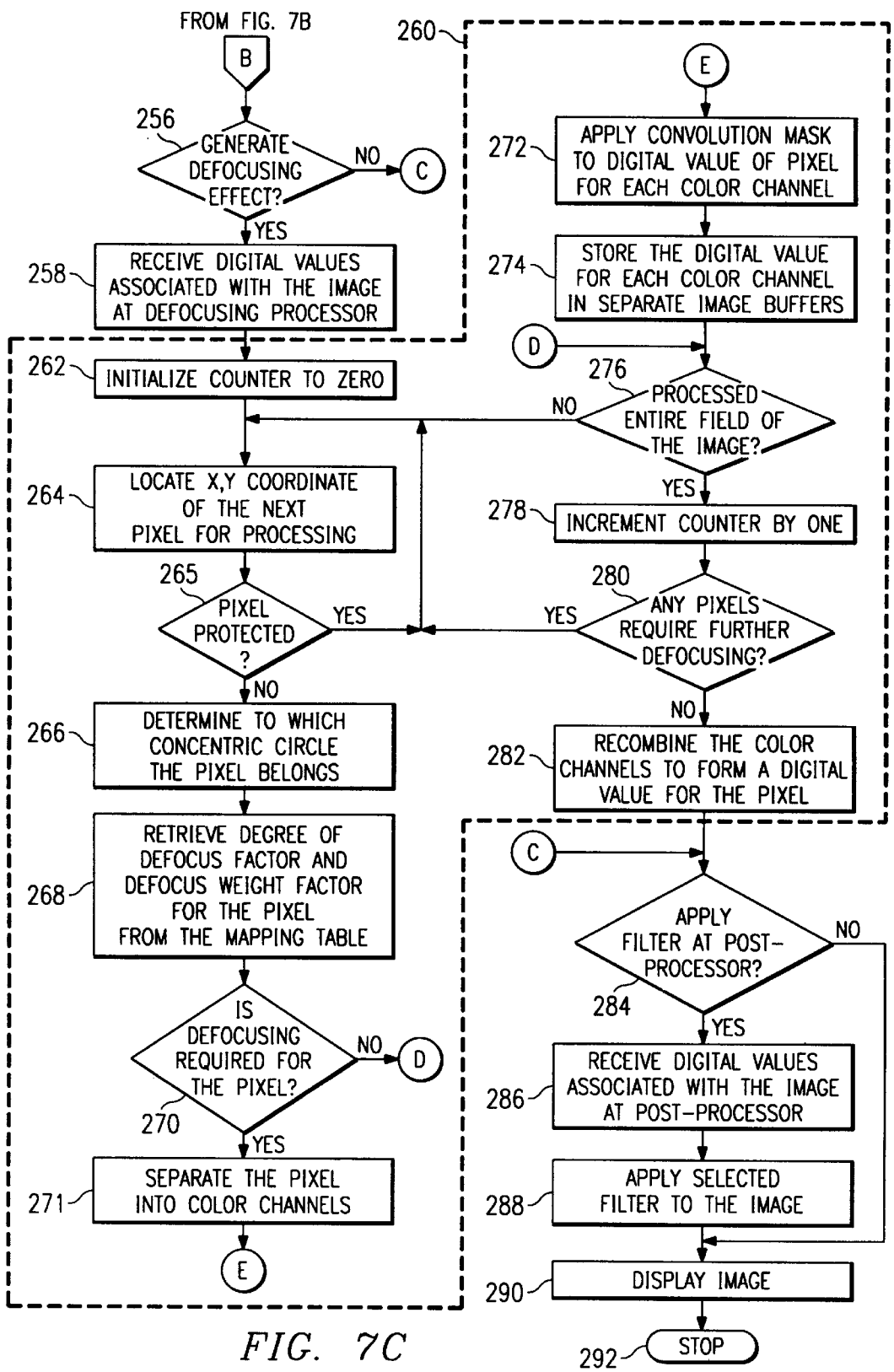

FIGS. 7A–7C are flowcharts of an exemplary method for simulating a depth of field of image 22. Referring to FIG. 7A, a user invokes camera simulation application 26 at step 200. Camera simulation application 26 accomplishes depth of field "focusing" of image 22 in a two dimensional space by simulating defocusing and light fall-off effects similar to those generated by a camera lens. Application 26 receives image 22 at step 202. The user selects camera parameters via GUI 28 of application 26 at step 204. In particular, the user selects a lens length parameter 30, a zoom factor 32, an f-stop setting 34, and a light fall-off parameter 38. Additionally, the user may enable or disable the defocusing effect or the light fall-off effect of camera simulation application 26 by toggling buttons 37 and 38.

The user selects point of focus 46 on image 22 by positioning a viewfinder presented by GUI 28 over a portion of image 22, at step 206. Point of focus 46 specifies that point on image 22 from which the defocusing and light fall-off effects will emanate. The viewfinder presented by GUI 28 is similar to one found in a traditional camera lens and it measures an x,y coordinate for point of focus 46. In one embodiment, the user selects one or more regions of focus, in addition to point of focus 46, to defocus and generate light fall-off at different levels of depth to simulate more enhanced camera-like effects.

Figure mapper 100 receives x,y coordinates for point of focus 46 and width and height dimensions for image 22, measured in pixels, at step 208. Figure mapper 100 divides image 22 into concentric figures having progressively larger sizes, at step 210, each figure having point of focus 46 as its center. Although the following method is described with reference to concentric circles, it should be understood that figure mapper 100 may divide image 22 into many different concentric figures, such as, for example, circles, pear shapes, ovals, squares, or triangles. Figure mapper 100 determines the radius of each concentric circle at step 212. After determining the radius of each concentric circle, figure mapper 100 populates radius column 116 of mapping table 106 accordingly, at step 214.

Light fall-off mapper 102 receives radius 116 of each concentric circle and the camera parameters selected by the user, at step 216. Light fall-off mapper 102 determines level of brightness factor 118 for each concentric circle of image 22 at step 218, as described above with reference to FIG. 3A. After determining level of brightness factor 118 for each concentric circle of mapping table 106, light fall-off mapper 102 populates level of brightness column 118 of mapping table 106 accordingly, at step 220.

Defocusing mapper 104 receives radius 116 of each concentric circle and the camera parameters selected by the user, at step 222. Defocusing mapper 104 determines degree of defocus factor 122 and defocus weight factor 120 for each concentric circle of image 22, at step 224, as described above with reference to FIG. 3A. Defocusing mapper 102 populates degree of defocus column 122 and defocus weight column 120 of mapping table 106 accordingly, at step 226.

Application 26 determines whether to apply a filter at pre-processor 108, at step 228. If not, execution proceeds to step 234. If so, pre-processor 108 receives digital values associated with image 22 at step 230. Pre-processor 108 applies to image 22 a selected filter, such as, for example, a color filter, a flare filter, or a soft focus filter, at step 232. In one embodiment, pre-processor 108 separates each pixel of image 22 into separate color channels, applies the appropriate filter to each pixel for each color channel, and recombines each color channel to form image 24. Pre-processor 108 stores the pre-processed digital values of image 22 in an associated image buffer at step 233.

Referring to FIG. 7B, application 26 determines whether to generate a light fall-off effect in response to the status of light fall-off enable button 38, at step 234. If not, execution proceeds to step 256. If so, light fall-off processor 110 receives digital values for image 22 at step 236. Light fall-off processor 110 applies a level of brightness factor 118 to each pixel of image 22 at steps 238. In particular, processor 110 locates the x,y coordinate of the next pixel for processing at step 240. Pixel locator 140 determines whether the pixel lies within a protected region of focus at step 241. If so, execution returns to step 240. If not, execution proceeds to step 242. Pixel locator 140 maps the pixel to an associated concentric circle at step 242. For example, pixel locator 140 compares the distance between the x,y coordinate of the pixel and point of focus 46 with radius 116 of each concentric circle to determine in which concentric circle the pixel resides. Channel manager 142 separates the pixel into different color channels, at step 244. For example, channel manager 142 separates the pixel into red, green, and blue color channels for individual processing.

Pixel processor 144 retrieves level of brightness factor 118 for the pixel from mapping table 106 according to which concentric circle the pixel belongs, at step 246. Pixel processor 144 applies level of brightness factor 118 associated with the pixel to the digital value of the pixel for each color channel, at step 248, and stores the results in separate image buffers 25, at step 250. For example, pixel processor 144 applies the light fall-off factor associated with the pixel to the digital value of the red channel associated with the pixel, to the digital value of the green channel associated with the pixel, and to the digital value of the blue channel associated with the pixel. Channel manager 142 recombines the separate color channels to form image 24, at step 252. Processor 110 determines whether any remaining pixels require processing at step 254. For example, in a light fall-off processor that follows a raster scan format, processor 110 determines whether an entire field of image 22 has been rastered. If no remaining pixels require processing, execution proceeds to step 256. If remaining pixels require processing, execution returns to step 240 where processor 110 locates the x,y coordinate of the next pixel for processing.

Application 26 determines whether to generate a defocusing effect in response to the status of defocus enable button 37, at step 256. If not, execution proceeds to step 284. If so, defocusing processor 112 receives digital values associated with image 22 at step 258. Defocusing processor 112 applies a defocusing effect to each pixel of image 22 at steps 260. In particular, defocusing processor 112 initializes a counter to zero at step 262. Processor 112 locates the x,y coordinate of the next pixel for processing at step 264. Pixel locator 160 determines whether the pixel lies within a protected region of focus at step 265. If so, execution returns to step 264. If not, execution proceeds to step 266. Pixel locator 160 maps the pixel to an associated concentric circle at step 266. Processor 112 retrieves defocus weight factor 120 and degree of defocus factor 122 from mapping table 106 according to which concentric circle the pixel belongs, at step 268. Processor 112 determines whether defocusing is required for the pixel currently being processed at step 270. Specifically, defocusing processor 112 compares degree of defocus factor 122 of the pixel with the current value of the counter to determine whether that pixel requires additional defocusing. If degree of defocus factor 122 of the pixel is greater than the value of the counter, then execution proceeds to step 271. If not, execution proceeds to step 276. Channel manager 162 separates the pixel into separate color channels, at step 271. As described above, channel manager 162 may separate each pixel into red, green, and blue color channels for individual processing.

Referring to FIG. 7C, pixel processor 164 applies a convolution mask, as described above with reference to FIG. 6, to the digital values of the pixel's color channels at step 272. Processor 112 stores the digital values of the pixel for each color channel in separate image buffers 25, at step 274. Defocusing processor 112 determines whether it has processed an entire field of image 22 at step 276. If not, execution returns to step 264 where processor 112 locates the x,y coordinate of the next pixel for processing. If the entire field of image 22 has been processed, processor 112 increments the counter by one, at step 278.

Defocusing processor 112 determines whether any pixels require further defocusing by comparing the counter with the largest degree of defocus factor 122 stored in mapping table 106, at step 280. For example, if any degree of defocus factor 122 stored in mapping table 106 is greater than the value of the counter, then execution returns to step 266, where defocusing processor 112 locates the x,y coordinate of the next pixel for defocusing. If no degree of defocus factors 122 stored in mapping table 106 are greater than the value of the counter, execution proceeds to step 282, where channel manager 162 recombines the separate color channels to form image 24, at step 282.

Application 26 determines whether to apply a filter associated with post-processor 114, at step 284. If not, execution proceeds to step 290. If so, post-processor 114 receives digital values associated with image 22, at step 286. Post-processor 114 applies a selected filter to image 22 at step 288. In one embodiment, post-processor 114 separates each pixel of image 22 into separate color channels, applies the appropriate filter to each pixel for each color channel, and recombines each color channel to form image 24. Application 26 displays image 24 exhibiting camera-like light fall-off and defocusing effects, and filtering, at step 290. Execution concludes at step 292.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for simulating the depth of field of an image in a two-dimensional space, comprising:

a memory operable to store an image formed using a plurality of pixels;

an input device operable to specify a plurality of input parameters for adjusting the image about a specified point of focus;

a processor coupled to the memory and the input device and operable to divide the image into a plurality of figures, wherein each figure is oriented about the specified point of focus, the processor further operable to adjust the image according to each figure, in response to the input parameters.

2. The system of claim 1, further comprising a display coupled to the processor and operable to display the adjusted image.

3. The system of claim 1, wherein the figures comprise circles of varying radii, each circle having a center at the specified point of focus.

4. The system of claim 1, wherein the processor further comprises:
   a defocusing mapper operable to generate a plurality of defocusing factors in response to the input parameters, each defocusing factor assigned to a particular figure; and
   a defocusing processor operable to separate the image into color channels, to apply to each pixel the defocusing factor of the corresponding figure for each color channel, and to recombine the color channels to form the adjusted image.

5. The system of claim 4, wherein each defocusing factor comprises:
   a degree of defocus factor; and
   a defocus weight factor.

6. The system of claim 4, wherein the defocusing processor applies to each pixel the defocusing factor of the corresponding figure in a number of passes specified by the defocusing factor.

7. The system of claim 4, wherein the defocusing processor applies to each pixel the defocusing factor of the corresponding figure if the pixel is not protected by a region of focus.

8. The system of claim 1, wherein the processor further comprises:
   a light fall-off mapper operable to generate a plurality of light fall-off factors in response to the input parameters, each light fall-off factor assigned to a particular figure; and
   a light fall-off processor operable to separate the image into color channels, to apply to each pixel the light fall-off factor of the corresponding figure for each color channel, and to recombine the color channels to form the adjusted image.

9. The system of claim 8, wherein the light fall-off processor applies to each pixel the light fall-off factor of the corresponding figure if the pixel is not protected by a region of focus.

10. The system of claim 1, wherein the processor further comprises a filter subsystem.

11. The system of claim 1, wherein the input parameters comprise:
   a zoom factor parameter specifying the focal length of a camera lens through which the depth of field of the image is simulated;
   an f-stop parameter specifying the size of the aperture opening of the camera lens; and
   a light fall-off parameter simulating a degree of exposure of the film upon which the image is captured.

12. A method for simulating the depth of field of an image in a two-dimensional space, comprising:
   receiving an image formed using a plurality of pixels;
   specifying a point of focus on the image;
   receiving input parameters for adjusting the image about the specified point of focus;
   dividing the image into a plurality of figures, wherein each figure is oriented about the specified point of focus; and
   adjusting the image progressively about the specified point of focus according to the figures, in response to the input parameters.

13. The method of claim 12, further comprising displaying the adjusted image.

14. The method of claim 12, further comprising filtering the image.

15. The method of claim 12, wherein the step of adjusting further comprises
   defocusing the image progressively about the specified point of focus according to the figures.

16. The method of claim 12, wherein the figures comprise circles of varying radii, each circle having a center at the specified point of focus.

17. The method of claim 15, wherein the step of defocusing comprises:
   generating a plurality of defocusing factors in response to the input parameters, each defocusing factor assigned to a particular figure;
   separating the image into color channels;
   applying to each pixel the defocusing factor of the corresponding figure for each color channel; and
   recombining the color channels to form the adjusted image.

18. The method of claim 17, wherein the step of applying to each pixel the defocusing factor comprises applying to each pixel the defocusing factor of the corresponding figure in a number of passes specified by the defocusing factor.

19. The method of claim 17, wherein the step of applying to each pixel the defocusing factor comprises applying to each pixel the defocusing factor of the corresponding figure if the pixel is not protected by a region of focus.

20. The method of claim 17, wherein each defocusing factor further comprises:
   a degree of defocus factor; and
   a defocus weight factor.

21. The method of claim 12, wherein the step of adjusting further comprises
   varying the level of light fall-off of the image progressively about the specified point of focus according to the figures.

22. The method of claim 21, wherein the figures comprise circles of varying radii, each circle having a center at the specified point of focus.

23. The method of claim 21, wherein the step of varying the level of light fall-off further comprises:
   generating a plurality of light fall-off factors in response to the input parameters, each light fall-off factor assigned to a particular figure;
   separating the image into color channels;
   applying to each pixel the light fall-off factor of the corresponding figure for each color channel; and
   recombining the color channels to form the adjusted image.

24. The method of claim 23, wherein the step of applying to each pixel the light fall-off factor comprises applying to each pixel the light fall-off factor of the corresponding figure if the pixel is not protected by a region of focus.

25. The method of claim 12, wherein the input parameters comprise:
   a zoom factor parameter specifying the focal length of a camera lens through which the depth of field of the image is simulated;

an f-stop parameter specifying the size of the aperture opening of the camera lens; and a light fall-off parameter simulating a degree of exposure of a film upon which the image is captured.

26. A computer graphics program for simulating the depth of field of an image in a two dimensional space, the program encoded on a computer-readable medium and operable to execute the following steps:

receiving an image formed using a plurality of pixels;

specifying a point of focus on the image;

receiving input parameters for adjusting the image about the specified point of focus;

dividing the image into a plurality of figures, wherein each figure is oriented about the specified point of focus;

adjusting the image progressively about the specified point of focus according to the figures, in response to the input parameters; and displaying the adjusted image.

27. The computer graphics program of claim 26, further operable to filter the image.

28. The computer graphics program of claim 26, wherein the figures comprise circles of varying radii, each circle having a center at the specified point of focus, and the step of adjusting further comprises:

generating a plurality of defocusing factors and light fall-off factors in response to the input parameters, each factor assigned to a particular circle; and applying to each pixel each factor of the corresponding circle.

29. The computer graphics program of claim 28, wherein the step of applying further comprises applying to each pixel each factor of the corresponding circle if the pixel is not protected by a region of focus.

30. The computer graphics program of claim 28, wherein the step of applying each factor further comprises:

separating the image into color channels;

applying to each pixel the defocusing factor of the corresponding circle for each color channel;

applying to each pixel the light fall-off factor of the corresponding circle for each color channel; and recombining the color channels to form the adjusted image.

31. The computer graphics program of claim 30, wherein the step of applying to each pixel the defocusing factor comprises applying to each pixel the defocusing factor of the corresponding circle in a number of passes specified by the defocusing factors.

32. The computer graphics program of claim 28, wherein each defocusing factor comprises:

a degree of defocus factor; and a defocus weight factor.

33. The computer graphics program of claim 26, wherein the input parameters comprise:

a zoom factor parameter specifying the focal length of a camera lens through which the depth of field of the image is simulated;

an f-stop parameter specifying the size of the aperture opening of the camera lens; and a light fall-off parameter simulating a degree of exposure of a film upon which the image is captured.

* * * * *

UNITED STATES PATENT AND TRADEMARK OFFICE
CERTIFICATE OF CORRECTION

PATENT NO. : 6,148,113
DATED : November 14, 2000
INVENTOR(S) : Michael A. Wolverton et al.

It is certified that error appears in the above-identified patent and that said Letters Patent is hereby corrected as shown below:

On the title page, [54] delete "SYSTEM FOR STIMULATING THE DEPTH OF FIELD OF AN IMAGE IN TWO DIMENSIONAL SPACE AND METHOD OF OPERATION" and insert -SYSTEM FOR SIMULATING THE DEPTH OF FIELD OF AN IMAGE IN TWO DIMENSIONAL SPACE AND METHOD OF OPERATION--.

Signed and Sealed this

Twenty-ninth Day of May, 2001

Attest:

NICHOLAS P. GODICI

*Attesting Officer*  *Acting Director of the United States Patent and Trademark Office*